May 2, 1967  C. G. SHUERT  3,316,802
COPYING METHOD AND APPARATUS
Filed Aug. 13, 1964  4 Sheets-Sheet 2

INVENTOR.
CECIL G. SHUERT
BY
Barnes, Kisselle, Raisch & Choate
ATTORNEYS

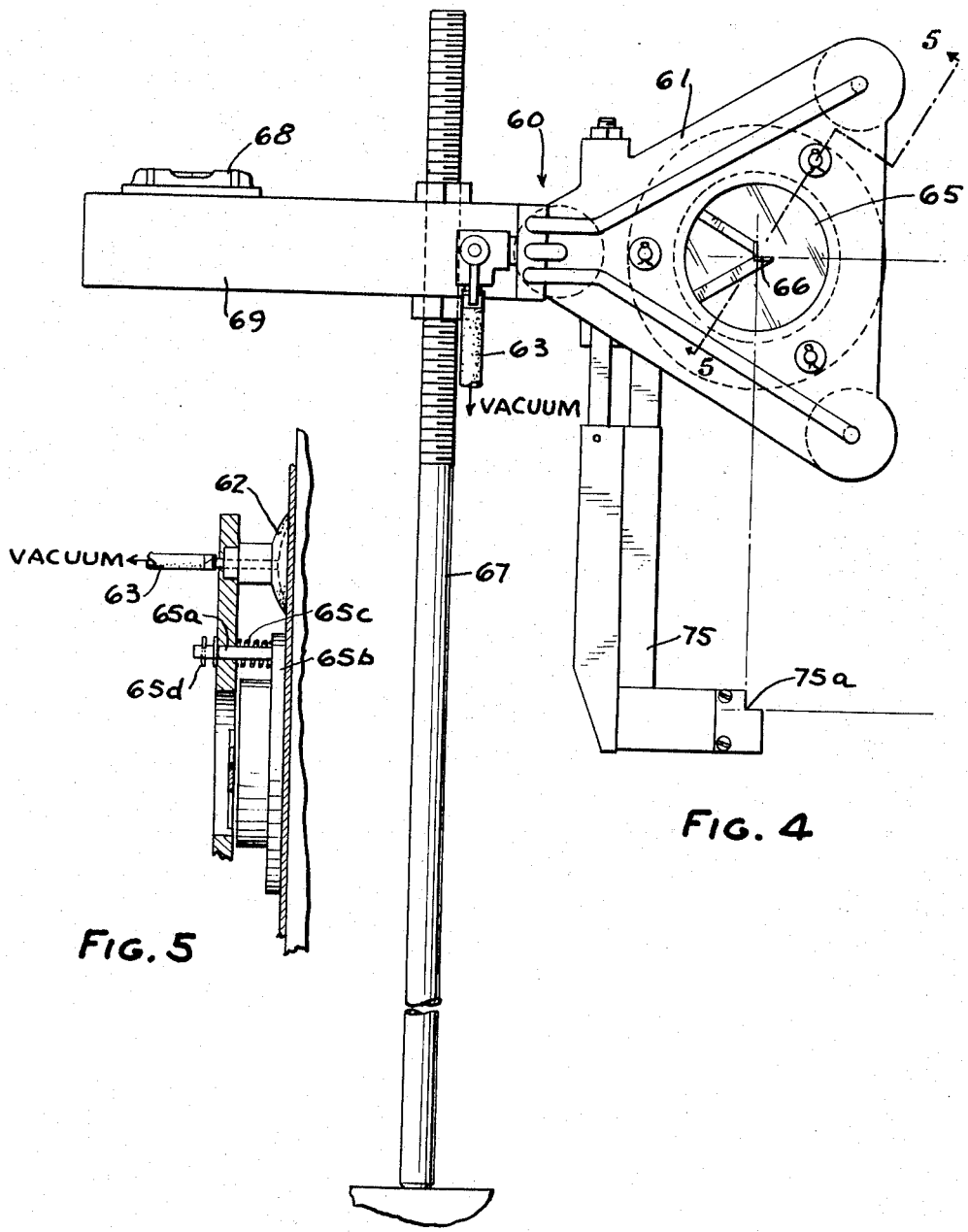

May 2, 1967  C. G. SHUERT  3,316,802
COPYING METHOD AND APPARATUS

Filed Aug. 13, 1964  4 Sheets-Sheet 4

INVENTOR.
CECIL G. SHUERT
BY
ATTORNEYS

United States Patent Office 3,316,802
Patented May 2, 1967

3,316,802
COPYING METHOD AND APPARATUS
Cecil G. Shuert, Grosse Pointe, Mich.
(13550 Conant, Detroit, Mich. 48212)
Filed Aug. 13, 1964, Ser. No. 389,369
4 Claims. (Cl. 88—24)

This invention relates to accurately dimensioned drawings such as loft drawings which are utilized in the making of parts such as automobile frames and bodies and aircraft structural members.

In the reproducing of loft drawings and the like, it has been common practice to produce a large negative of the drawing which is thereafter copied as desired to produce the required degree of accuracy in the positive which may be placed upon a sensitized plastic sheet, metal sheet, or the like, see Stewart Patent No. 2,852,373 and Shuert Patent No. 2,940,850.

The problem of storage of such large drawings is a very severe one and it is an object of this invention to provide a method and apparatus for making small, accurate negatives which can be readily stored and thereafter used to produce the larger size drawings.

Another problem with respect to such drawings is that it is often desired to reproduce the drawings in a different size in order to have the reproduced drawings include a shrinkage factor or the like.

The apparatus heretofore used necessitated having a very accurately formed bed such as used on a lathe and mounting a very stable accurately formed camera on one end and a stable accurately formed drawing support at the other end. Such an apparatus is expensive, bulky and subject to misalignment.

It is therefore an object of the invention to provide a method and apparatus for copying drawings accurately introducing a change in size as may be required.

It is a further object of the invention to provide an apparatus for copying drawings which is relatively low in cost as contrasted to fixed apparatus that has been heretofore available.

In the drawings:

FIG. 4 is a front elevational view of a portion of the apparatus shown in FIG. 1.

FIG. 5 is a sectional view taken along the line 5—5 in FIG. 4.

Figure 1:
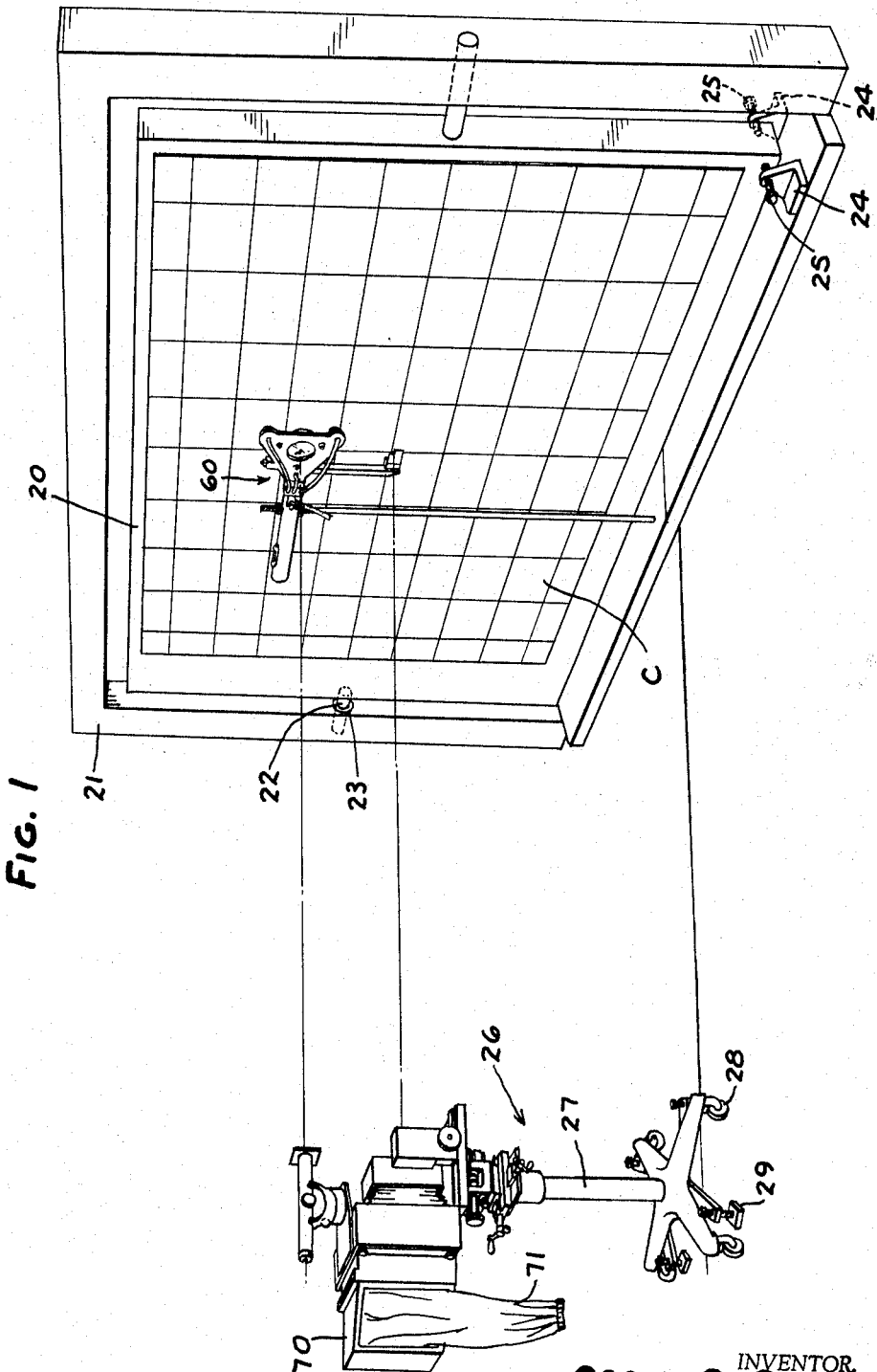
FIG. 1 is a perspective view of an apparatus for performing a portion of the method embodying the invention.

Referring to FIG. 1, the apparatus comprises a frame 20 which is adapted to support a drawing C that is to be copied. The frame 20 preferably comprises a vacuum frame which by the application of vacuum draws the drawing C, which may be a plastic or metal drawing, in flat relationship to the plane of the frame. Such frames are well known in the art.

The frame 20 is mounted in a rectangular support 21 for swinging movement about a horizontal axis by shafts 22 projecting into journals 23 in the upright portions of the support 21. Jack screws 24 are provided on support 21 adjacent the lower end of the frame and include screws 25 that are threaded into engagement with the frame 20 to hold the frame in generally vertical relation, as hereinafter described.

A camera assembly 26 is provided and includes a dolly 27 whereby the camera can be rolled on the floor and brought into position adjacent the frame 20. Dolly 27 is provided with casters 28 and adjustable pads 29 whereby the dolly can be moved into position and the pads 29 lowered to hold the camera in position relative to the frame 20.

Figure 2:
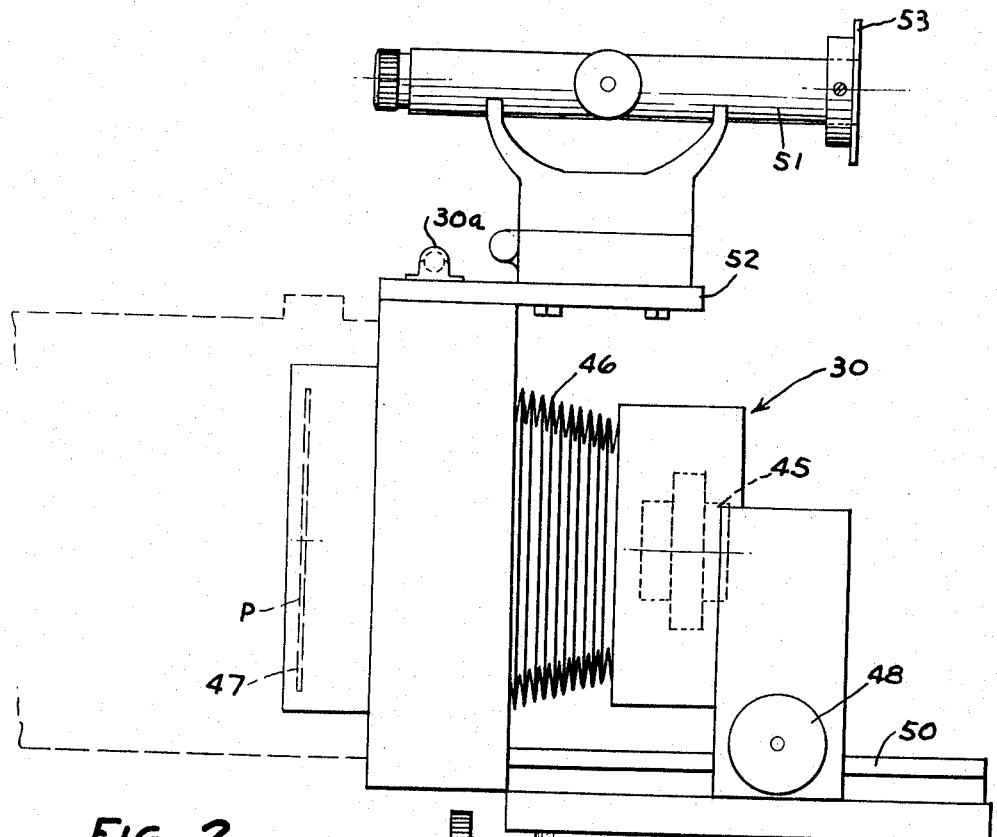
FIG. 2 is a fragmentary side elevational view of the camera apparatus utilized in the invention, parts being broken away.
Figure 3:
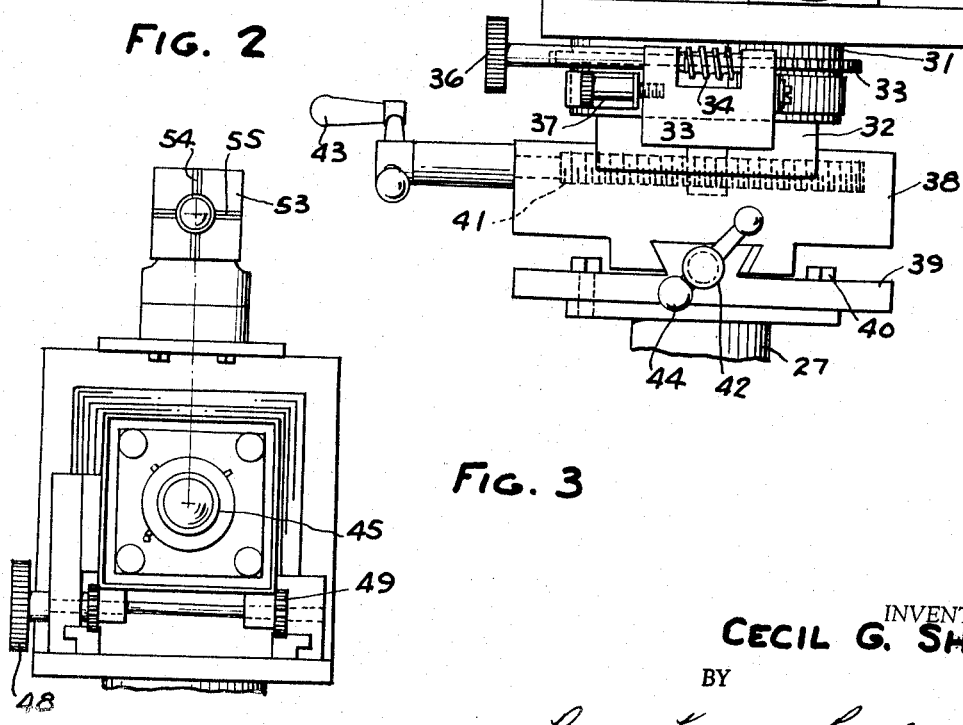
FIG. 3 is a front elevational view of the camera.
Figure 6:
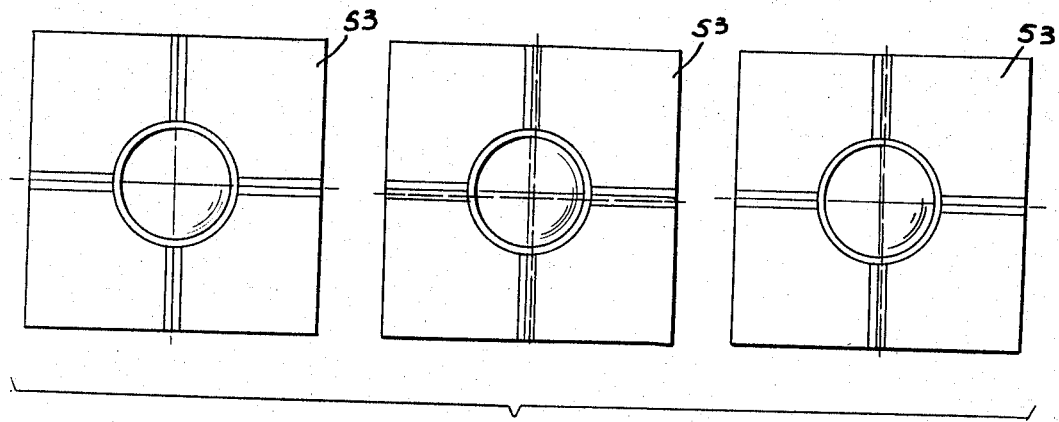
FIG. 6 is diagrammatic views showing alignment of the camera and a drawing being copied.
Figure 7:
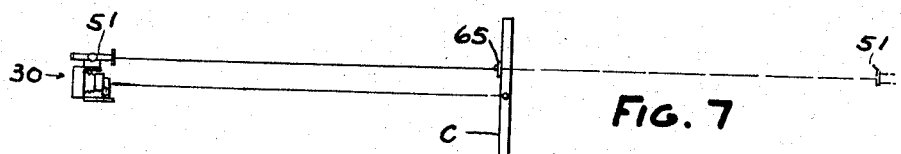
FIGS. 7 and 8 are side elevational views showing the alignment of the camera to the drawing being copied.
Figure 8:
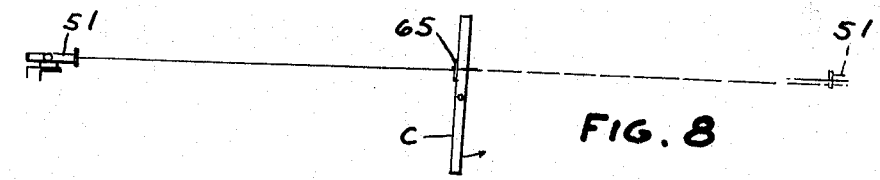
Figure 9:
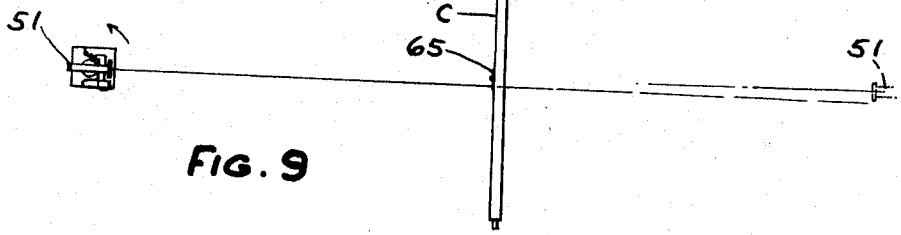
FIG. 9 is a plan view showing the alignment of the camera with the drawing being copied.

As shown in FIGS. 2 and 3, a camera 30 is mounted on a rotary table 31 which, in turn, is rotatably mounted on a slide 32. Rotary table 31 is provided with a circular gear 33 which is meshed with a worm 34 journalled on a bracket 35 fixed to the slide 32. When a handle 36 on worm 34 is rotated, the camera 30 is rotated. A band type friction brake 37 is mounted on bracket 35 and surrounds table 31 so that when it is tightened the camera is locked rotationally. Slide 32 is mounted for translatory movement on a block 38. Block 38 is, in turn, mounted for translational movement at right angles on a mounting plate 39 fixed by bolts 40 on the upper end of the dolly 27. Screws 41, 42 operated by handles 43, 44, respectively, mesh with the slide 32 and block 38, respectively, to provide for ready translation thereof.

The camera 30 is of conventional plate construction but all parts are made to extreme accuracies. The camera 30 includes a lens 45, bellows 46 and a film plane 47. The lens 45 is adapted to be translated by rotation of a knob 48 which rotates gears 49 that mesh with tracks 50 all in accordance with conventional practice.

However, the camera is made with particular precision so that the axis of lens 45 is at right angles to the film plane 47 in which a ground glass or a photographic plate P is placed.

In addition, a viewing scope 51 is mounted by a bracket 52 on the camera with the axis of the scope 51 precisely parallel with the axis of the lens 45. The scope is provided with vertical and horizontal cross hairs and a reflection target 53 is mounted on the end of the scope and has vertical and horizontal center lines 54, 55.

Referring to FIGS. 1, 4 and 5, an aligning assembly 60 is provided adjacent the frame 20 and includes a bracket 61 having vacuum cups 62 thereon connected by line 63 to a source of vacuum whereby when vacuum is applied to the cups, the bracket 61 is clamped against the drawing C on the vacuum frame 20. A mirror 65 is yieldingly supported on bracket 61 by means of pins 65a fixed to the mirror frame 65b and extending through openings on the bracket 61. Springs are interposed between bracket 61 and the mirror frame about each pin and yieldingly urge the mirror outwardly. Cotter pins 65d serve as stops. When vacuum is applied to cups 62, the bracket 61 yieldingly urges mirror frame 65b against the drawing C so that the plane of mirror 65 is parallel to the plane of drawing C.

A toothed right angular target 66 is mounted in frame 65b in overlying relationship to the mirror 65. In order to assist in placing the assembly 60 adjacent the drawing, a vertical steadying rod 67 is threaded into the bracket 61. The lower end of rod 67 engages support 21 to hold the bracket 61 in position until vacuum is applied. In addition a horizontal bubble level 68 is mounted on an extension 69 of the bracket 61. A locator 75 is also vertically adjustably mounted on bracket 61.

As shown in FIG. 1, a black box 70 with a sleeve 71 is provided on the end of the camera whereby the opertor's arm can be inserted through the sleeve 71 into the into the box 70 to manipulate the ground glass and the photographic plates within the camera.

In practice, the drawing C to be copied is placed upon the frame 20 and the frame is rotated to bring the drawing into vertical position. If the frame is the vacuum type, vacuum has been applied to hold the drawing in a fixed plane on the frame. The aligning apparatus 60 is positioned against the drawing with toothed part 75a of locator 75 at approximately the center of the portion of the drawing to be copied. In placing the aligning apparatus 60 in position, it is leveled by use of the level 68.

The camera apparatus 26 is then brought into position adjacent the frame 20. The camera apparatus 26 is then manipulated generally to align the camera axis with the locator 75. This is done by viewing through the camera on a ground glass placed on the film plane 47 with the box 70 removed.

The operator then views the reflection target 53 on the end of the viewing scope 51 by looking through the scope 51 at the reflection from mirror 65. The camera is then moved until the vertical and horizontal cross hairs of the viewing scope 51 are in the general area of the vertical and horizontal center lines 54, 55 of the reflection target 53. The jacks 29 are then dropped to raise the caster 28 of the camera apparatus 26 from the floor. The jacks 29 are adjusted utilizing the horizontal bubble level 30a so that the camera is exactly level. The operator then removes the ground glass from image plane 47, if it has not been heretofore removed, and applies the box 70 to the camera. The box 70 has one or more photographic plates stored therein. The operator inserts his hand through the sleeve into the box 70 to remove any cover slide which may be provided over the photographic plates and grasps a plate and moves it into position adjacent the film plane 47 of the camera. In this manipulation, the operator must exercise care to insure that the photographic plate is placed accurately against the stops on the film plane 47 so that it will be squarely on the film plane 47.

The scope 51 is then focused on the reflection target 53 by use of the mirror 65 and the camera is rotated by use of the knob 36 to bring the vertical cross hair of the scope into alignment with the vertical center line 54 of the reflection target 53. The brake 37 is then manipulated to lock the camera.

The operator then views through the scope 51 and manipulates the vacuum device 20 by use of jack screws 25 to bring the horizontal hair lines of the viewing scope 51 into alignment with the horizontal center line 55 of the reflection target 53.

The apparatus is now set up for exposure of the photographic plate. The camera lens is then opened to expose the photographic plate. After exposure, the plate is removed and developed.

In order to produce the final positive copy of the drawing to the required ratio of dimensions to the original drawing, the same camera is used as an enlarger with the now developed photographic plate being placed in position in the film plane 47 and light is directed through the camera to project an accurate image of the drawing. In making the exposure of the positive to produce the copy, the sensitized positive is mounted on a frame like the frame 20 in the path of camera and the axis of the lens of the camera is again aligned with the plane of the frame in a similar manner to produce the desired copy, the sensitized positive being exposed in the manner disclosed in said Patent Nos. 2,852,373 and 2,940,850. Alternatively for smaller size positives, the camera can be mounted in the place of an enlarger on a conventional enlarger bed wherein the axis of the enlarger is fixed with relation to the support for the positive to be exposed.

What I claim is:

1. The method of reproducing loft drawings and the like to any specific ratio with respect to an original which comprises the steps of holding the drawing to be copied in a fixed frame,
holding a mirror in position on the face of the drawing with the plane of the mirror parallel to the plane of the drawing,
bringing a camera into position adjacent the drawing,
said camera having a viewing scope mounted thereon with the axis of the scope in accurate parallel relationship to the axis of the lens of the camera and a reflection target on the end of the scope, said target having a vertical cross hair and a horizontal cross hair,
leveling the camera,
rotating the camera to position the vertical cross hair of the scope in alignment with the vertical center line of the reflection target as reflected by the mirror held on the drawing,
moving said frame to bring the horizontal cross hair of the scope into alignment with the horizontal center line of the reflection target as reflected by the mirror held on the drawing,
inserting an unexposed photographic plate in the camera,
exposing the photographic plate,
developing the photographic plate,
repositioning the exposed photographic plate in the camera,
positioning an unexposed positive in the line of sight of the camera,
aligning the plane of the positive so that it is perpendicular to the axis of the lens of the camera,
directing light through the exposed negative and the camera and thereby utilizing the camera for enlarging the exposed negative and projecting an enlarged image on the unexposed positive,
thereby exposing the positive,
and developing the positive to produce a copy of the original drawing to precise accurate dimensions and precise ratio of size to the original drawing.

2. The method of reproducing loft drawings and the like to any specific ratio with respect to an original which comprises the steps of holding the drawing to be copied in a fixed frame,
holding a mirror in position on the face of the drawing with the plane of the mirror parallel to the plane of the drawing,
bringing a camera into position adjacent the drawing,
said camera having a viewing scope mounted thereon with the axis of the scope in accurate parallel relationship to the axis of the lens of the camera and a reflection target on the end of the scope,
said target having a vertical cross hair and a horizontal cross hair,
leveling the camera,
rotating the camera to position the vertical cross hair of the scope in alignment with the vertical center line of the reflection target as reflected by the mirror held on the drawing,
moving said frame to bring the horizontal cross hair of the scope into alignment with the horizontal center line of the reflection target as reflected by the mirror held on the drawing,
focusing the camera through a ground flat plate mounted therein on the reflection target reflected from the mirror positioned on the drawing,
removing the ground glass plate from the camera,
inserting an unexposed photographic plate in position in the camera in place of the ground glass plate,
exposing the photographic plate.

3. An apparatus for copying loft drawings and the like and making reproductions to precise dimensions and ratio of size to the original drawing comprising a frame,
means for supporting the frame for swinging movement about a horizontal axis,
means on the frame for holding a loft drawing or the like thereon with the plane of the drawing in fixed position relative to the frame,
means for holding and angularly adjusting the frame in vertical position,
target means comprising a mirror,
means for mounting the mirror on the frame in overlying parallel relation to a drawing on the frame,
a camera, a dolly,
means for mounting the camera on the dolly for movement relative to the dolly,
a viewing scope,
means for supporting the viewing scope on the camera with the axis of the scope accurately aligned with the axis of the lens of the camera,
said viewing scope having vertical and horizontal cross hairs,
a reflection target mounted on the end of said viewing scope and having horizontal and vertical center lines,
said camera having a film plane which is accurately formed so that it is at right angles to the axis of the lens,
means for supporting a ground glass and a photographic plate alternatively in said film plane,
whereby a drawing can be mounted on the frame and the camera aligned with the drawing on the frame by moving the dolly to position the camera adjacent the portion of the drawing to be copied,
rotating the camera to align a vertical cross hair of the viewing scope with a vertical center line of the reflection target on the scope,
and rotating the frame about said horizontal axis to align the horizontal cross hair of the viewing scope with the horizontal center line of the reflection target,
thereafter placing a photographic plate in the camera and exposing the photographic plate,
said camera being thereafter used to project the image of the photographic plate after development onto an unexposed positive to produce an accurately dimensioned drawing of the desired size.

4. An apparatus for copying loft drawings and the like and making reproductions to precise dimensions and ratio of size to the original drawing comprising
a frame,
means for supporting the frame for swinging movement about a horizontal axis,
vacuum means on the frame for holding a loft drawing or the like thereon with the plane of the drawing in fixed position relative to the frame,
means for holding and angularly adjusting the frame in vertical position,
target means comprising a mirror,
means for yieldingly mounting the mirror on the frame in overlying parallel relation to a drawing on the frame,
a camera,
a dolly,
means for mounting the camera on the dolly for movement relative to the dolly,
a viewing scope,
means for supporting the viewing scope on the camera with the axis of the scope accurately aligned with the axis of the lens of the camera,
said viewing scope having vertical and horizontal cross hairs,
a reflection target mounted on the end of said viewing scope and having horizontal and vertical center lines,
said camera having a film plane which is accurately formed so that it is at right angles to the axis of the lens,
means for supporting a ground glass and a photographic plate alternatively in said film plane,
whereby a drawing can be mounted on the frame and the camera aligned with the drawing on the frame by moving the dolly to position the camera adjacent the portion of the drawing to be copied,
rotating the camera to align a vertical cross hair of the viewing scope with a vertical center line of the reflection target on the scope,
and rotating the frame about said horizontal axis to align the horizontal cross hair of the viewing scope with the horizontal center line of the reflection target,
therefter placing a photographic plate in the camera and exposing the photographic plate,
said camera being thereafter used to project the image of the photographic plate after development onto an unexposed positive to produce an accurately dimensioned drawing of the desired size.

References Cited by the Examiner

FOREIGN PATENTS 888,538    1/1962    Great Britain.

NORTON ANSHER, *Primary Examiner.*

R. A. WINTERCORN, *Assistant Examiner.*